United States Patent [19]

Perry et al.

[11] Patent Number: 4,989,642
[45] Date of Patent: Feb. 5, 1991

[54] THROTTLING VALVE

[75] Inventors: Dave L. Perry, Syracuse; Harold H. Hopkinson, Manlius, both of N.Y.; Caldwell Jones, Holland, Pa.; John D. Moeller, Clay; Gabriel Silva, Liverpool, both of N.Y.

[73] Assignee: Young & Franklin, Inc., Liverpool, N.Y.

[21] Appl. No.: 459,321

[22] Filed: Dec. 29, 1989

[51] Int. Cl.⁵ .............................................. F16K 47/04
[52] U.S. Cl. ........................ 137/625.37; 137/625.33; 137/625.3; 251/121; 251/122; 138/45
[58] Field of Search ...................... 137/625.37, 625.33, 137/625.3; 251/121, 122; 138/40, 44, 45

[56] References Cited

U.S. PATENT DOCUMENTS

| | | | |
|---|---|---|---|
| 240,549 | 4/1881 | Salomon | 137/505.12 |
| 2,810,259 | 10/1957 | Burdett, Jr. | 137/625.37 X |
| 4,003,405 | 1/1977 | Hayes et al. | |
| 4,150,696 | 4/1979 | Meier et al. | |
| 4,473,210 | 9/1984 | Brighton | 137/625.37 X |
| 4,607,819 | 8/1986 | Spils | 251/121 |

FOREIGN PATENT DOCUMENTS 180621 2/1936 Switzerland ...................... 251/121

OTHER PUBLICATIONS

Control Components Inc. Brochure, *DRAG Control Valves for Critical Service Applications.*

Primary Examiner—Arnold Rosenthal
Attorney, Agent, or Firm—Wall and Roehrig

[57] ABSTRACT

A throttling valve that has an outer ring unit having a plurality of superimposed cylindrical shaped outer throttling rings that define a series of annular passages between the rings. An inner ring unit also having a plurality of superimposed cylindrical shaped inner throttling rings is adapted to movably support the inner rings within the annular passages to establish elongated flow orifices between the adjacent surfaces of the rings. The geometry of each orifice is arranged so that the fluid in transit remains attached to the control surfaces of each orifice and to insure that the static pressure along the length of the orifice remains above the dynamic pressure. The tip region of each orifice is provided with a diverging flow section to further insure quiet performance along the entire length of the orifice.

20 Claims, 3 Drawing Sheets

THROTTLING VALVE

BACKGROUND OF THE INVENTION

This invention relates to a throttling valve for controlling the flow of liquids to produce quiet flow conditions at relatively high flow rates.

Valve noise has become of increasing concern lately for reasons of environmental safety. Numerous valve configurations have been developed over the last thirty years in attempts to either suppress or control noise. In many of the earlier devices, the valve and its surrounding flow channels are wrapped with acoustical materials for absorbing sound. Later designs involve fixed and movable attenuators which are placed directly into the flow path to divide the main flow stream into a series of subflows or to shape the geometry of the flow. Attenuators, however, represent obstructions in the flow path which create special design considerations and which can, under certain operating conditions, produce rather than suppress noise.

Flow interrupting devices have also been proposed in the prior art which act on the moving fluid to shift the noise frequency out of the audible range. One such device is described in U.S. Pat. No. 4,150,696 to Meier et al. Here again, the frequency shifting mechanism typically obstructs flow and thus can disrupt the normal flow pattern of the fluid as it moves through the valve.

The prior art has generally been concerned with suppressing existing valve noise once it has been generated. The present invention is concerned with eliminating or avoiding factors that create noise producing vibrations. These factors may be either flow related or mechanical in nature. These noise producing factors may include such things as cavitation, turbulent flow conditions, fluid separation at the flow boundaries, and obstructions in the flow path.

OBJECTS AND SUMMARY OF THE INVENTION

It is therefore a primary object of the present invention to improve throttling valves, and primarily, valves which handle liquids.

A still further object of the present invention is to improve the performance of a throttling valve by quieting the valve over a wide flow range.

Another object of the present invention is to quiet a valve without the use of flow obstructing devices.

Yet another object of the present invention is to eliminate or avoid factors which generate noise producing vibrations in throttling valves.

Yet a still further object of the present invention is to provide a throttling valve with a plurality of elongated flow orifices having control surfaces that perform work upon the fluid in transit under controlled conditions whereby cavitation, turbulent flow conditions, and flow separation at the boundaries are avoided.

These and other objects of the invention are attained by a throttling valve that includes an outer ring unit having a plurality of cylindrical shaped outer throttling rings that are spaced apart to provide annular passages therebetween. An inner ring unit also contains a plurality of cylindrical shaped inner throttling rings and is mounted in relation to the outer ring unit so that the inner rings are axially aligned inside the annular passages to establish elongated control orifices between the adjacent ring surfaces The adjacent surfaces control the flow passing through each orifice and taper to permit the rings to close securely against each other. One of the ring units is axially positionable in relation to the other whereby the orifices can be selectively opened and closed to control the flow passing therethrough.

The geometry of each orifice is designed whereby the flow remains attached to the adjacent surfaces of the ring and the static pressure exceeds the dynamic pressure at any point along the entire length of the orifice.

In one embodiment of the invention, each orifice contains a main section having a uniform cross sectional area and a predetermined length and a tip section that diverges at a given angle to maintain quiet flow conditions at the distal end of each orifice.

BRIEF DESCRIPTION OF THE DRAWINGS

For a better understanding of these and other objects of the present invention, reference shall be made to the following detailed description of the invention which is to be read in conjunction with the accompanying drawings, wherein.

DETAILED DESCRIPTION OF THE PREFERRED EMBODIMENT

Figure 1:
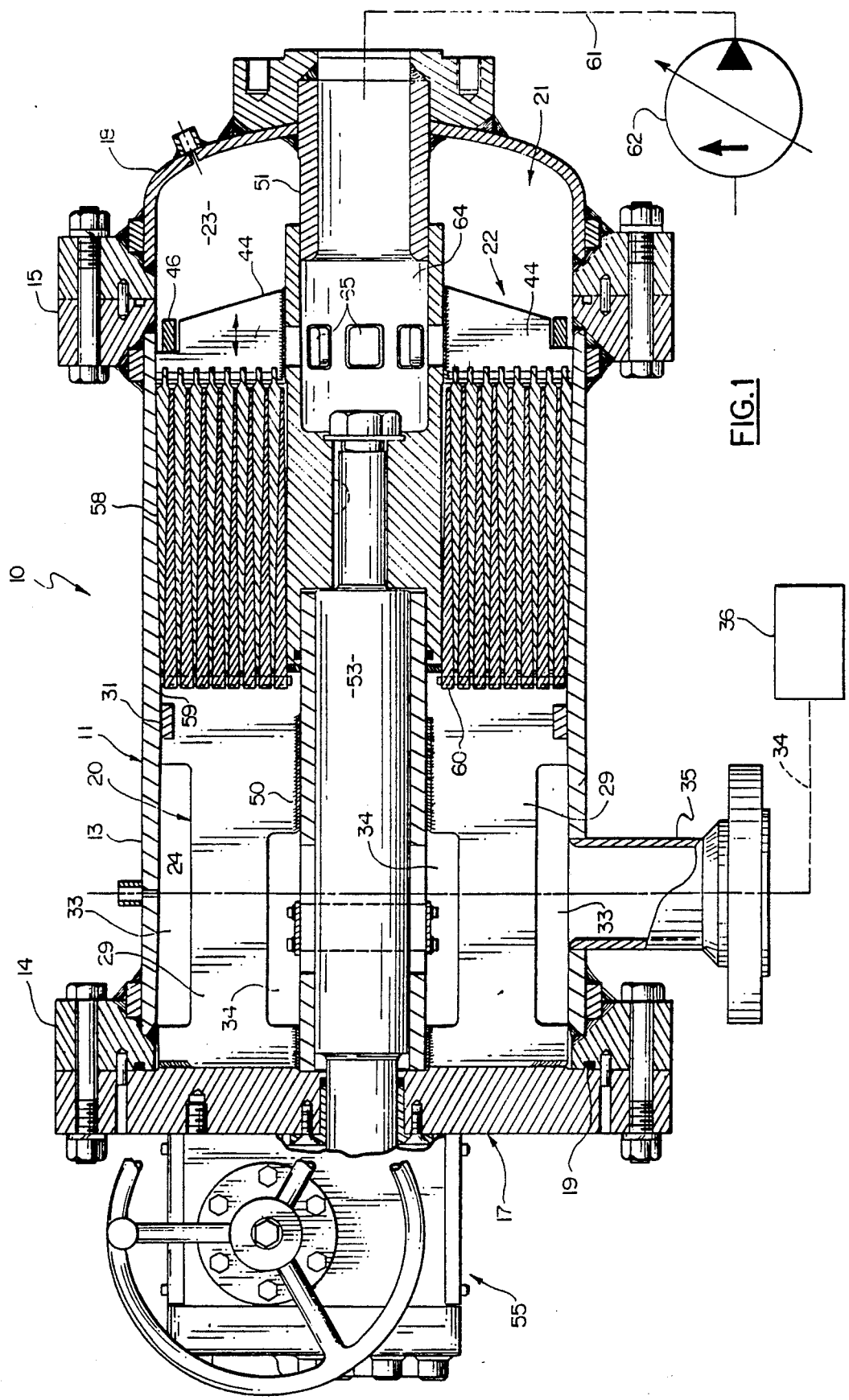
FIG. 1 is a side elevation in section showing the construction of a throttling valve embodying the teachings of the present invention.
Figure 2:
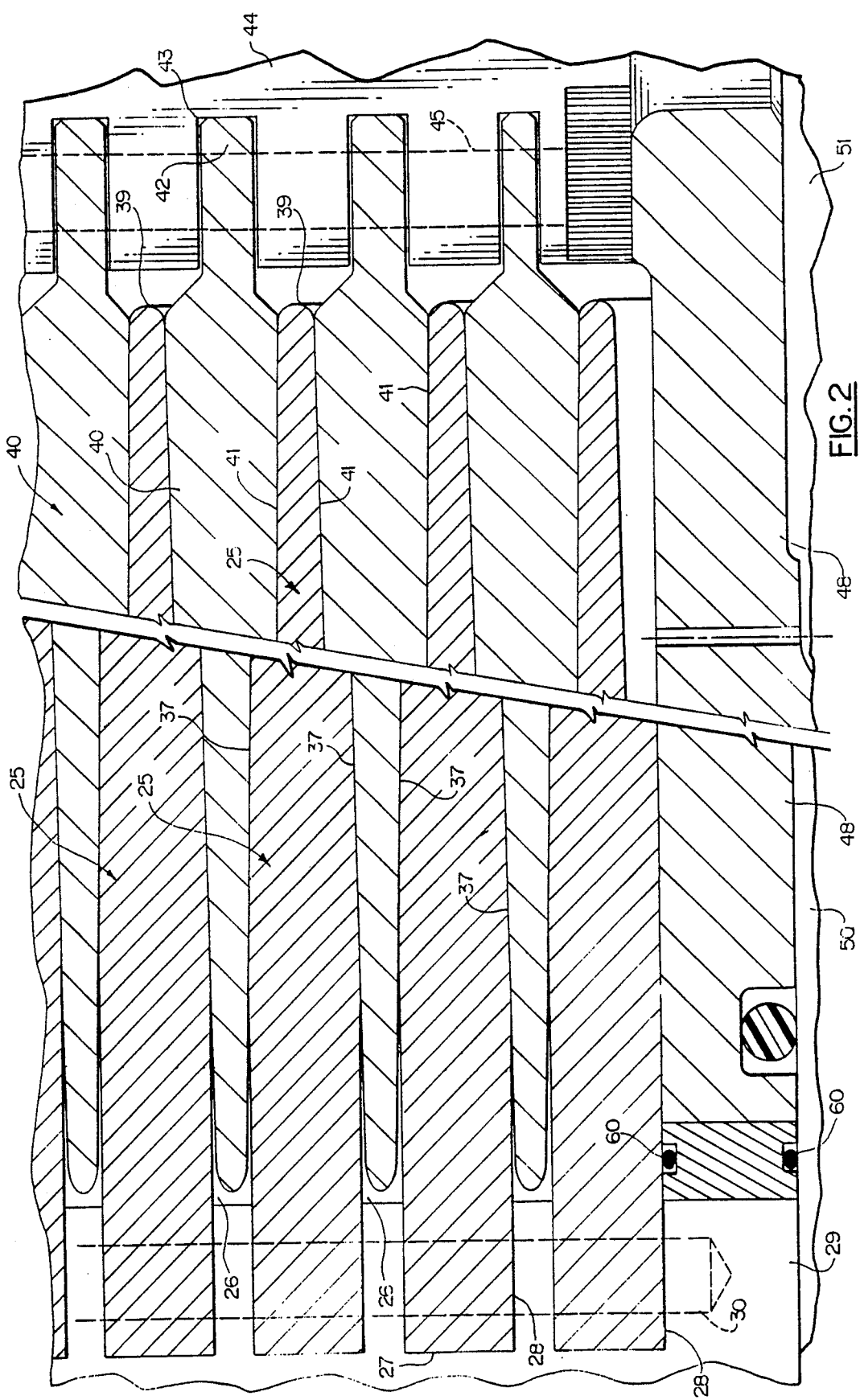
FIG. 2 is an enlarged view, in section, showing the construction of the inner and outer ring units employed in the present invention with the rings shown in a fully closed position.

Turning initially to FIGS. 1 and 2, there is illustrated a valve assembly, generally referenced 10, that embodies the teachings of the present invention. The valve assembly includes a housing 11 containing a cylindrical casing 13 having bolting flanges 14 and 15 at the opposite ends thereof. An end plate 17 is secured to end flange 14 using suitable bolts 12—12 and an end cap 18 is similarly bolted to end flange 15 to close the housing. Seals 19—19 are mounted in the end flanges to render the flange joints fluid-tight.

A fixed throttling ring unit 20 is mounted within the housing opening 21. The fixed ring unit coacts with a movable throttling ring assembly 22 to control the flow of a fluid as it moves from a high pressure inlet chamber 23 to a lower pressure outlet chamber 24. The stationary rings 25—25 are a series of different diameter cylinders that are superimposed one inside the other in spaced apart axial alignment to form annular passages 26—26 therebetween. The proximal ends 27—27 (FIG. 2) of the stationary rings are contained in cutouts 28—28 provided in a plurality of web members 29—29 that are circumferentially spaced about the interior of the outlet region chamber 24.

The fixed rings 25—25 are secured to the individual web members by means of a pin 30 that is passed through the proximal ends of the rings as shown in FIG. 2. One end of each web member is welded to end plate 17 of the housing and a reinforcing ring 31 is passed about the opposite end of the members. The reinforcing ring is recessed in a notch cut in each web member and is welded to the individual members to hold them in alignment in assembly. Cutouts 33 and 34 are furnished in each web member to permit fluid to move freely through the outlet chamber. A connector 35 is used to place the outlet chamber in communication via discharge line 34 with a downstream resistance which can be a regulator, operating equipment, or simply a supply tank. The downstream resistance maintains the pressure in the outlet chamber at a given level which is above the vapor pressure of the fluid being processed. Although the present valve can handle a wide range of fluids, it is specifically designed to handle water.

The opposed elongated circular sidewalls 37—37 of each fixed ring taper inwardly from the proximal end 27 of the ring toward the distal end 39 so that the ring is narrower at the tip than at the root. As a result of this construction, the annular passages 26—26 formed between the fixed rings converge from the root of the rings toward their tips.

Movable throttling rings 40—40 are slidably contained inside the tapered annular passages formed between the stationary throttling rings. Sidewalls 41—41 of the movable rings are also tapered at the same angle as the fixed rings along a major portion of their ring length to permit the movable rings to be closed snugly against the stationary rings, as shown in FIG. 2 thereby preventing fluid form moving therebetween. Each movable ring contains a necked down flange 42 at its proximal end that is fitted into cutouts 43, machined in a series of circumferentially spaced support brackets 44—44. The flanges of the movable rings are secured in each bracket by means of a pin 45 (FIG. 2). A reinforcing ring 46 surrounds the bracket assembly and is welded thereto to help support and align the brackets in assembly.

The base of each bracket 44 is welded to a circular carriage 48. The carriage is slidably mounted upon two hollow sleeves 50 and 51 that are aligned along the central axis of the housing. Sleeve 50 is secured in end plate 17 of the housing while sleeve 51 is similarly secured in the opposing end cap 18. A shaft 53 is contained within sleeve 50 and is bolted at one end to the carriage. The opposite end of the shaft passes through the end plate into a gear box 55 which is mounted upon the outside of the end plate. The shaft is coupled to a crank 56 by means of a worm and wheel arrangement (not shown) so that the carriage, and thus the movable rings, can be moved axially upon the sleeves. The movable rings are shown in FIG. 1 in a fully closed position within the annular passages provided between the fixed rings. Moving the slide to the right, as viewed in FIG. 1, will separate the tapered surfaces of the rings. By adjusting the axial relationship of the rings, the size of the orifice openings can be controlled to obtain a desired rate of flow through the valve.

The inside surface of the housing is provided with a tapered section 58 (FIG. 1) that compliments the tapers carried by the fixed and movable rings. This surface 58 coacts with the last or outermost ring on the movable ring unit to furnish an additional flow orifice between the outermost ring and the housing. O-rings 60—60 (FIG. 2) are mounted upon the carriage which prevents fluid from passing between the carriage and both the sleeve 50 and the innermost ring on the fixed ring unit whereby fluid in the inlet chamber can only pass into the outlet chamber through the control orifice series.

Hollow sleeve 51 passes through the end cap 18 and is coupled by supply line 61 to a variable pressure compensating pump 62. Sleeve 51 also communicates with a flow distributor 64 located inside the slide mechanism 48. The distributor contains a series of ports 65—65 that direct the incoming fluid into the inlet chamber 23 of the housing. The pressure in the inlet chamber is maintained by the pump at a predetermined value such that the pressure difference between the chambers does not exceed a predetermined maximum value.

Figure 4:
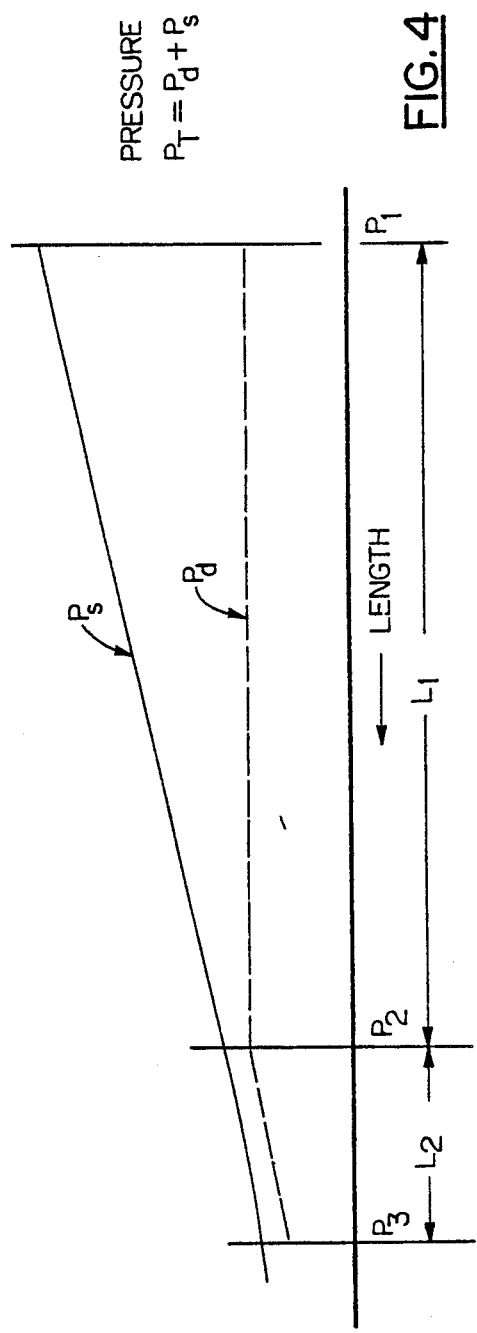
FIG. 4 is a diagrammatic view showing the dynamic and static pressure response along the length of the orifice illustrated in FIG. 3.
Figure 3:
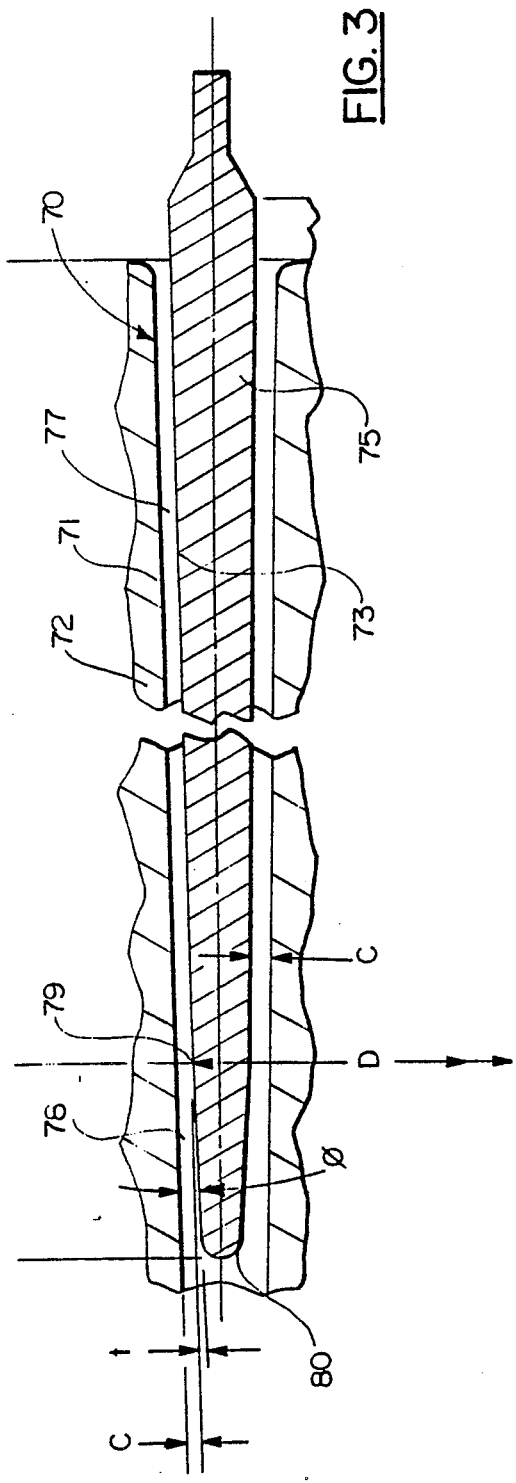
FIG. 3 is a schematic representation showing the control orifices in an open position.

With further reference to FIGS. 3 and 4, there is shown in schematic outline an elongated control orifice 70 embodying the teachings of the present invention. The orifice is formed between the surface 71 of fixed outer ring 72 and in adjacent surface 73 of movable inner ring 75. The movable inner ring is shown pulled back from the fixed ring to permit fluid to move from the inlet chamber to the outlet chamber. As noted above, the orifice contains a primary section 77 of length $L_1$ having a uniform cross sectional area and a secondary tip section 78 of length $L_2$ that diverges from the root 79 towards the distal end 80 of the movable ring 75 at an angle $\theta$. The pressure at the inlet chamber will be assumed to $P_1$, at the root of the tip section $P_2$ and at the outlet $P_3$ where $P_1 > P_2 > P_3$.

As best seen in FIG. 4, the dynamic pressure along the length $L_1$ of the primary section remains constant while the static pressure drops uniformly along the length of this section. The primary section of the orifice is set at a predetermined length such that the static pressure at the root of the tip section, that is, the exit region of the primary section of the orifice, is greater than the dynamic pressure at this point.

The total pressure drop across the primary section of the orifice $\Delta P_A = P_1 - P_2$ and is related to the flow rate Q as follows:

$$\Delta P_A = K \cdot Q \tag{1}$$

where:

$$K = f(\mu, L_1, c, D)$$

and:

$\mu$ is fluid viscosity
$L_1$ is the length of the primary orifice section
c is the separation distance between adjacent ring surfaces
D is the maximum diameter of the movable ring. For the configuration shown the value of K is as follows:

$$K = \frac{12\mu L_1}{\pi Dc^3} \tag{2}$$

The pressure drop across the main section of the orifice can now be defined as:

$$\Delta P_A = \frac{12 Q\mu L_1}{\pi Dc^3} \tag{3}$$

Using the above relationship (3) the length of the main section of the orifice can be determined for a maximum pressure drop so that the dynamic pressure will not exceed the static pressure along the length of this primary section. By maintaining this relationship, the flow will remain attached to the control surfaces 71 and 73 along the length of the primary section. If the length of the primary section is extended beyond the limit $L_1$, the flow can become choked and unwanted noise generated. To prevent choking and unwanted flow disturbances from being developed in the flow orifices, the distal ends of each movable throttling ring is contoured so that the orifice diverges at the tip sections under controlled conditions to prevent noise from being developed in this critical region.

The angle of divergence $\theta$ is arranged to maintain the flow attached to the control surface of the secondary section and to also insure that the dynamic pressure along this section remains below the static pressure. As illustrated in FIG. 4, the dynamic pressure which is constant along the primary section of the orifice decreases uniformly with static pressure as the flow moves through the secondary tip section of the orifice. The total pressure drop across the tip section $\Delta P_3 = (P_2 - P_3)$ and is proportional to the flow rate Q wherein:

$$\Delta P_B = (K \cdot Q) \quad (4)$$

where:

$$K = f(\mu, L_2, c, D, K_1)$$

and $L_2$ is the flow path length of the secondary section,
$K_1$ is the effect produced by the diverging geometry
For the tip configuration shown in FIG. 4, the values of K and $K_1$ are as follows:

$$K = \frac{12\mu L_2}{\pi Dc^3} \cdot K_1 \quad (5)$$

where:

$$K_1 = \frac{(2 + t/c)}{2(1 + t/c)^2} \quad (6)$$

and :

$$t = \tan \theta L_2$$

The pressure drop across the tip section of the orifice for a given flow rate Q can now be expressed as:

$$\Delta P_B = \frac{12 Q\mu L_2}{\pi Dc^3} \cdot \frac{(2 + t/c)}{2(1 + t/c)^2} \quad (7)$$

As can be seen by use of the above noted relationship (7), the angle of divergence and the length of the tip section can be determined for a maximum pressure drop across the tip section of the orifice.

As should be evident from the disclosure above, an orifice geometry can be designed using these relationships, while at the same time delivering a high rate of flow under extremely quiet flow conditions. As a result of this geometry, the fluid in transit remains attached to the friction control surfaces defining the flow orifice boundaries along the entire length of each orifice, and the static pressure cannot exceed the dynamic pressure at any point along the length of each orifice. The diverging tip configuration permits the length of each orifice to be extended without sacrificing quiet valve performance. The multiple orifice configuration furnished by the coacting throttling ring units further provides an extremely compact package that can result in the saving of a considerable amount of space. It should be further noted that the quiet performance of the present throttling valve is attained by eliminating or avoiding noise producing factors and without the need of placing obstructions in the flow path, again adding to the compactness of the structure and the simplicity of design.

While this invention has been explained with reference to the structure disclosed herein, it is not confined to the details as set forth and this application is intended to cover any modifications and changes as may come within the scope of the following claims.

What is claimed is:

1. A throttling valve that includes
    a housing having an inlet means that is axially aligned with an outlet means and a linear flow path connecting the inlet and the outlet means,
    an outer ring unit mounted in the flow path having a first mounting means secured to the proximal end of a plurality of superimposed cylindrical shaped outer throttling rings for supporting said outer rings in spaced apart axial alignment with said inlet and outlet means to provide annular passages between the wall surfaces of said outer rings,
    an inner ring unit also mounted in said flow path having a second mounting means secured to the proximal end of a plurality of superimposed cylindrical shaped inner throttling rings for supporting said inner rings in axial alignment inside the annular passages of said outer rings, the wall surfaces of adjacent rings forming a series of circular elongated control orifices extending axially between the inlet and outlet means, and
    said mounting means of one ring unit facing said inlet means and the mounting means of the other ring unit facing the outlet means with said adjacent wall surfaces of the superimposed inner and outer throttling rings being tapered at the same angle downwardly from the mounting means of each ring towards the tip end of each ring so that a flow of fluid passing through said passages remains attached to the walls of the passages as it moves from the inlet means to the outlet means.

2. The valve of claim 1 that further includes positioning means to axially reposition the ring units to vary the separation between the adjacent wall surfaces.

3. The valve of claim 2 wherein the inner ring unit is movably mounted upon a carriage means that is operably connected to said positioning means and said outer ring unit is stationarily connected to said housing.

4. The valve of claim 3 wherein said inlet means communicates with the entrance region to each of said orifices, said entrance regions being located at the proximal end of the inner ring units.

5. The valve of claim 4 wherein said outlet means communicates with the discharge region at the exit to each orifice, said discharge regions being located at the proximal end of the outer ring units.

6. The valve of claim 5 that includes control means to regulate the pressure at said inlet and outlet means so that the difference in pressure over each elongated control orifice does not exceed a predetermined maximum valve.

7. The valve of claim 6 wherein the fluid is a liquid and the control means maintains the pressure at the outlet means at a level above the vapor pressure of the liquid.

8. The valve of claim 7 wherein the length of the wall surfaces defining each elongated control orifice is related to the pressure drop maintained over the orifices so that liquid passing through each orifice remains attached to the ring surfaces along the entire length of said orifice.

9. The valve of claim 8 wherein the length of the wall surfaces are related to the maximum pressure drop over each orifice by the relationship:

$$\Delta P = \frac{12\, Q\mu\, L_1}{\pi\, Dc^3}$$

where:
Q is the flow rate through the orifice
$\mu$ is the viscosity of the liquid
D is the maximum diameter of the orifice
c is the separation distance between adjacent ring wall surfaces
$L_1$ is the length of the orifice.

10. The valve of claim 1 wherein said housing is cylindrical in form.

11. The valve of claim 10 wherein said inlet means further includes an inlet chamber that encloses the proximal end of the inner ring unit to deliver a fluid in process uniformly to the entrance of each orifice.

12. The valve of claim 11 wherein said outlet means further includes an outlet chamber that encloses the proximal end of the outer ring unit to receive said fluid discharged from the exit of each orifice.

13. The valve of claim 12 that further includes an end wall secured to said housing and axially disposed web means for connecting the outer ring unit to said end wall.

14. The valve of claim 13 that further includes sleeve means mounted within the housing along its central axis, a carriage means for supporting the inner ring unit upon said sleeve means and an axially positionable shaft means to selectively position said carriage means.

15. The valve of claim 14 wherein said sleeve means further includes a hollow section that passes through one end wall of the housing for delivering fluid into said housing, and port means in said hollow section for distributing incoming fluid into said inlet chamber.

16. The valve of claim 12 that further includes control means for regulating the fluid pressure in the inlet and outlet chamber so that the pressure difference between the inlet and outlet chamber does not exceed a predetermined maximum value.

17. The valve of claim 16 wherein the fluid is a liquid and said control means maintains the liquid pressure in said inlet chamber above the vapor pressure of the liquid.

18. The valve of claim 9 wherein each inner ring includes a tip section connected at its root to the distal end of said inlet ring, the side wall surfaces of the tip section being tapered from the root downwardly toward the ring tip so that the orifice formed between the inner ring wall surface and an adjacent outer ring wall surface diverges at an angle at the tip section.

19. The valve of claim 18 wherein the angle of divergence and the length of the orifice at the tip section are related to the pressure drop over the tip section such that the liquid remains attached to the wall surfaces of the diverging section of said orifice and wherein the static pressure remains above the dynamic pressure for any point along the diverging section of said orifice.

20. The valve of claim 19 wherein the angle of divergence $\theta$ and the orifice length $L_2$ of said tip section are related to the pressure drop $\Delta P_B$ over the tip section by the following relationship:

$$\Delta P_B = \frac{12\, Q\mu\, L_2}{\pi\, Dc^3} \cdot \frac{(2 + t/c)}{2\,(1 + t/c)^2}$$

where:

$t = \tan\theta \cdot L_2$

* * * * *